(12) United States Patent
Peckham et al.

(10) Patent No.: US 8,746,438 B1
(45) Date of Patent: Jun. 10, 2014

(54) LABELING APPARATUS USING VACUUM BASED LABEL TRANSPORT

(71) Applicant: NuLabel Technologies, Inc., Providence, RI (US)

(72) Inventors: Randy Peckham, North Scituate, RI (US); Benjamin David Lux, Pawtucket, RI (US)

(73) Assignee: NuLabel Technologies, Inc., East Providence, RI (US)

( * ) Notice: Subject to any disclaimer, the term of this patent is extended or adjusted under 35 U.S.C. 154(b) by 0 days.

(21) Appl. No.: 13/792,899

(22) Filed: Mar. 11, 2013

Related U.S. Application Data

(60) Provisional application No. 61/766,317, filed on Feb. 19, 2013.

(51) Int. Cl.
*B65C 9/08* (2006.01)
*B29C 63/38* (2006.01)

(52) U.S. Cl.
USPC .................. 198/471.1; 53/585; 53/292

(58) Field of Classification Search
None
See application file for complete search history.

(56) References Cited

U.S. PATENT DOCUMENTS

| | | | |
|---|---|---|---|
| 4,138,941 A * | 2/1979 | McMillin et al. | 101/40 |
| 4,252,497 A | 2/1981 | Burt | |
| 4,357,788 A * | 11/1982 | Amberg | 53/585 |
| 2005/0218575 A1 | 10/2005 | Cook et al. | |

* cited by examiner

*Primary Examiner* — Kavel Singh
(74) *Attorney, Agent, or Firm* — Fish & Richardson P.C.

(57) ABSTRACT

An apparatus and method for automatically modulating vacuum applied to a vacuum cup are described herein. More particularly an automated labeling apparatus and method for applying labels onto containers using a vacuum based transport mechanism is described herein.

16 Claims, 13 Drawing Sheets

LABELING APPARATUS USING VACUUM BASED LABEL TRANSPORT

CLAIM OF PRIORITY

This application claims priority under 35 USC §119(e) to U.S. Patent Application Ser. No. 61/766,317, filed on Feb. 19, 2013, the entire contents of which are hereby incorporated by reference.

FIELD

An apparatus and method for automatically modulating vacuum applied to a vacuum cup are described herein. More particularly an automated labeling apparatus and method for applying labels onto containers using a vacuum based transport mechanism is described herein.

BACKGROUND

For over 50 years, automated machines have been used to apply labels onto containers, such as bottles, cans or jars. Typically these machines utilize cold glue or hot melt adhesives which are applied by a roller onto a pad prior to pickup and then transfer of a label onto another pad or drum which applies it to a container. Conventional automated labeling machines include those manufactured by Krones AG in Germany or Krones, Inc. in Franklin Wis. (Krones AG and Krones, Inc., being referred to herein as "Krones").

SUMMARY

An apparatus and method for automatically modulating vacuum applied to a vacuum cup are described herein. More particularly an automated labeling apparatus and method for applying labels onto containers using a vacuum based transport mechanism is described herein.

In some aspects, a vacuum-based transport device that includes a pallet that includes an opening configured to provide vacuum for receiving and releasably securing an item to the pallet, a vacuum cup mounted in the opening having a central hole connected to the opening, and a vacuum modulation device configured to automatically modulate the vacuum applied to the vacuum cup based on the presence/absence of the item to be transported at the vacuum cup.

Embodiments can include one or more of the following.

The vacuum modulation device can include a plunger component moveable between an open position in which vacuum is applied to the vacuum cup and a closed position in which vacuum is not applied to the vacuum cup.

The plunger component can be configured to automatically move between the open position and the closed position based on a pressure differential formed upon removal of the item from the vacuum cup.

The vacuum modulation device can include a sealing device and a plunger component disposed in a cavity and moveable between a closed position in which the plunger device is in contact with the sealing device and airflow is restricted to the vacuum cup and an open position in which the plunger device is separated from the sealing device and airflow is permitted to the vacuum cup.

The opening has a first cross-sectional area and the plunger component includes an opening having a second cross-sectional area that is smaller than the first cross-sectional area.

The first and second cross-sectional areas can be configured to establish a pressure differential across the plunger component to cause the plunger component to move between the open position and the closed position upon removal of an item from the vacuum cup.

The system can also include a vacuum supply means mechanism for communicating vacuum to the opening.

The pallet can include a plurality of openings each having associated vacuum cups and vacuum modulation devices.

In some aspects, an apparatus for applying to containers labels having a back surface with fluid activatable adhesive includes a guidance mechanism configured to provide a path for receiving a plurality of labels having a back surface with a fluid activatable adhesive that is non-tacky until activated, the guidance mechanism including at least one rotating transfer member having a plurality of pallets. Each of the pallets includes a plurality of openings through which vacuum is selectively communicated, vacuum cups mounted in the openings for receiving and releasably securing a label to the pallet, each vacuum cup having a central hole connected to an associated opening, and vacuum modulation devices configured to automatically modulate the vacuum applied to an associated vacuum cup based on the presence or absence of the label at the associated vacuum cup. The system also includes an adhesive activation station along the path configured to apply to the back surface of said labels a fluid to activate said adhesive along said back surface of said label and a label application station at the end of the path configured to apply said labels with said activated adhesive onto an exterior surface of a corresponding object.

Embodiments can include one or more of the following.

The apparatus can also include a vacuum supply mechanism coupled to each of said pallets for communicating vacuum to said openings.

The vacuum modulation devices can each include a plunger component moveable between an open position in which vacuum is applied to the associated vacuum cup and a closed position in which vacuum is not applied to the associated vacuum cup.

The plunger component can be configured to automatically move between the open position and the closed position based on a pressure differential formed upon removal of the label from the vacuum cup.

The vacuum modulation devices can each include a sealing device and a plunger component disposed in a cavity and moveable between a closed position in which the plunger device is in contact with the sealing device and airflow is restricted to the associated vacuum cup and an open position in which the plunger device is separated from the sealing device and airflow is permitted to the associated vacuum cup.

The opening has a first cross-sectional area and the plunger component includes an opening having a second cross-sectional area that is smaller than the first cross-sectional area and the first and second cross-sectional areas are configured to establish a pressure differential across the plunger component to cause the plunger component to move between the open position and the closed position upon removal of the label from the associated vacuum cup.

BRIEF DESCRIPTION OF THE DRAWINGS

The foregoing and other objects, features and advantages of the invention will become more apparent from a reading of the following description in connection with the accompanying drawings in which.

DETAILED DESCRIPTION

Vacuum based devices can be used for lifting and transporting goods (e.g., transporting labels in a labeling system). Such vacuum based devices include a pallet with vacuum openings to which an item can be secured and transported when a vacuum is applied to the vacuum openings. The size and strength of a vacuum applied to the vacuum opening in the vacuum-based lifting devices can be based on the size and weight of the item to be transported. For example, a smaller vacuum can be used to transport a light item such as paper while a larger vacuum is required to transport a heavier item such as glass or metal.

Vacuum pallets which are designed to hold variable sized parts often require a large flow of the vacuum to accommodate areas of the pallet that are not in contact with the part/item to be transported. Additionally, if the system includes multiple pallets (e.g., multiple pallets on a turret as described in more detail below), the pallets that are not in use at any particular time additional require a large flow of the vacuum because the vacuum openings are not restricted by the item to be transported. The apparatus described herein automatically modulates the vacuum applied to a vacuum cup based on the presence/absence of the item to be transported at a particular vacuum cup. Automatically shutting off the vacuum flow to any unused vacuum cups (e.g., vacuum cups that are not used due to the size of the item to be transported and/or vacuum cups on a pallet not currently transporting an item) can significantly reduce the overall vacuum required for the system because the vacuum no longer needs to supply vacuum to the unused vacuum cups.

Figure 1A:
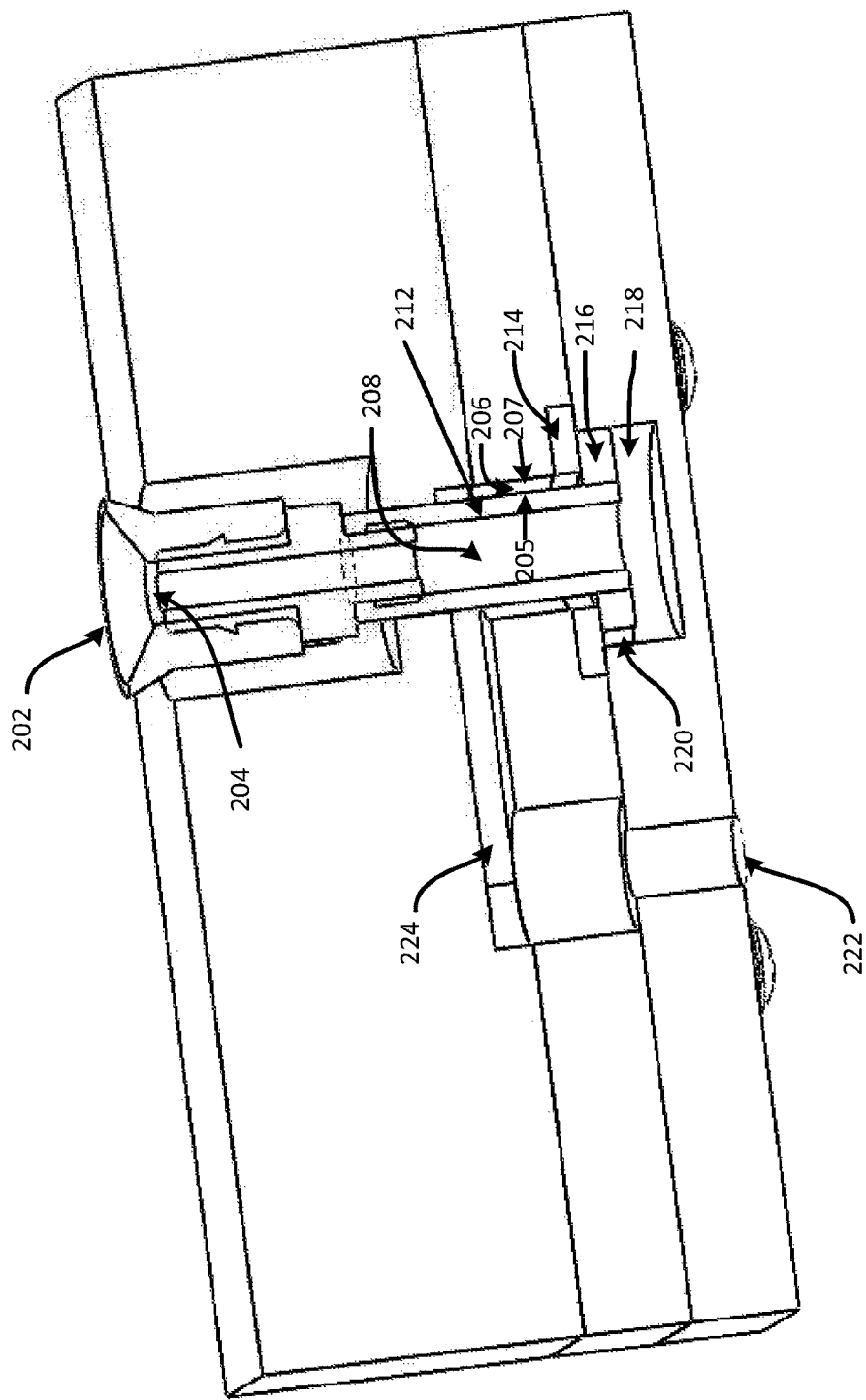
FIGS. 1A-1C are a schematic views of a vacuum device.
Figure 1B:
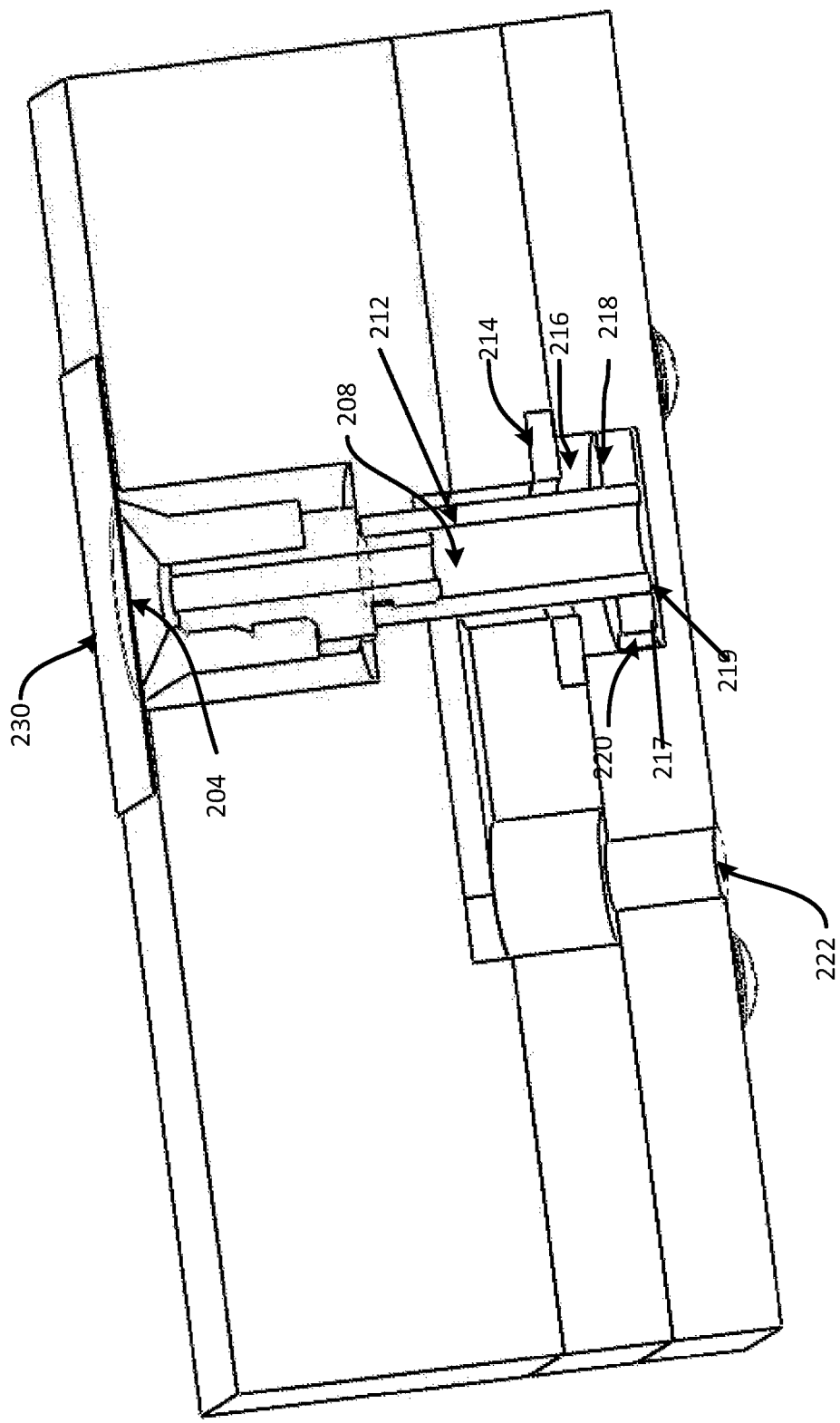
Figure 1C:
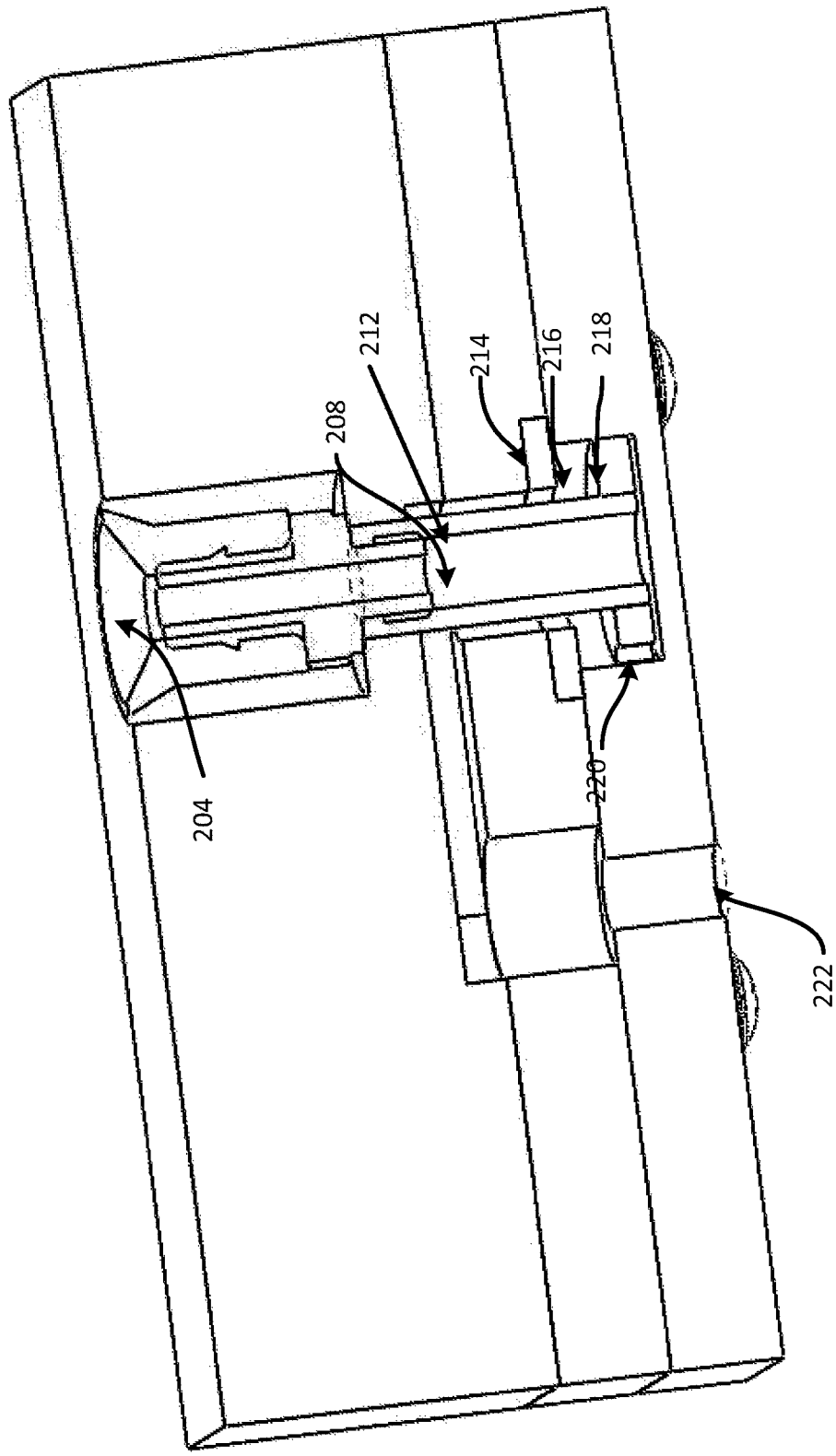

FIGS. 1A-1C show a device that automatically modulates the vacuum applied to a vacuum cup 202 (or other orifice). The vacuum cup 202 is connected to an associated plunger component 212 which allows vacuum flow to the vacuum cup 202 when the plunger component 212 is depressed (e.g., when the item to be transported is applied to the vacuum cup) and restricts vacuum flow to the vacuum cup 202 when the plunger component 212 is not depressed. As described in more detail below, when the plunger component 212 is depressed, an orifice 220 in the plunger component provides an airflow path between the vacuum port 222 and the vacuum cup 202 (e.g., as shown in FIG. 1B). While the item 230 to be transported remains in place, the vacuum cup 202 is subject to the full vacuum flow which retains the item 230 in contact with the vacuum cup 202. When the item 230 is removed, the plunger component 212 is pushed out such that the opening 206 in the plunger 212 contacts a seal 214 and no longer allows airflow between the vacuum port 222 and the vacuum cup 202 automatically shutting off vacuum flow to the vacuum cup 202 (as shown in FIG. 1A).

As shown in FIG. 1A, in an initial (closed) position when no item is in contact with the vacuum cup 202, the vacuum flow to the vacuum cup 202 is restricted. In this closed position, the vacuum plunger 212 is in an engaged position in which the bottom portion 216 of the plunger is in contact with the seal 214. Contact between the bottom portion 216 of the plunger 212 and the seal 214 closes the airflow path through the orifice 220. Thus, the vacuum path from the vacuum port 222 through the orifice 220 and opening 208 in the central portion of the plunger 212 is blocked by the contact between the bottom portion of the plunger 212 and the seal 214 which prohibits airflow through orifice 220. In this position, the vacuum cup 202 is at or near atmospheric pressure and the vacuum is maintained in a spacing 206 between the outer surface of the plunger 205 and a wall of the device 207 in a region above the seal 214.

As shown in FIG. 1B, once the item/media 230 is pushed against the vacuum cup 202 the plunger 212 is pushed moved to a non-engaged (open) position allowing vacuum flow to the vacuum cup 202. Application of the item/media 230 causes the vacuum cup 202 to be physically depressed breaking the seal between the bottom portion 216 of the plunger 212 and the seal 214. This provides an airflow path between the vacuum port 222 and the vacuum cup 202 through the opening 206, orifice 220, spacing 218 between the bottom surface 217 of the plunger 212 and the bottom surface 219 of the cavity 218, and the opening 208 in the central portion of plunger 212. In this position, the orifice 208 is no longer the restriction to the airflow, the media blocking the suction cup is, so there is no pressure differential across the plunger and no motivation for the plunger to rise to the closed position (e.g., as shown in FIG. 1A). Additionally, there is atmospheric pressure acting on the diameter of the shaft of the plunger forcing the plunger down, and maintaining vacuum to the cup 202.

FIG. 1C shows the device in a transition between the position of FIG. 1B and the closed position of FIG. 1A. Upon removal of the media 230 from the vacuum cup 202, flow is restored (e.g., the media 230 is no longer the restriction on airflow). The orifice 204 in the vacuum cup 202 has a larger cross-sectional area than the orifice 220 in the plunger 212. Thus, removal of the media 230 causes a pressure differential to develop across the plunger 212 (e.g., vacuum flow supplied through vacuum port 222 is restricted through the orifice 220 causing a pressure differential across the plunger 212). This pressure differential will cause the plunger 212 to rise toward the seal 214 and once again shut off vacuum flow to the vacuum cup 202.

As noted above, the smaller cross-sectional area of the orifice 220 compared to the opening 204 in the vacuum cup 202 results in a pressure differential across the plunger 212 when there is no media in contact with the vacuum cup 202 to restrict airflow through the vacuum cup 202. In some particular examples, a ratio of the cross-sectional area of the orifice 220 to the cross-sectional area of the opening 204 in the vacuum cup 202 can be at least about 1:2 (e.g., the ratio can be about 1:2, 1:3, or 1:4). The orifice 220 can be any desired shape such as circular, rectangular, or semicircular.

Figure 2A:
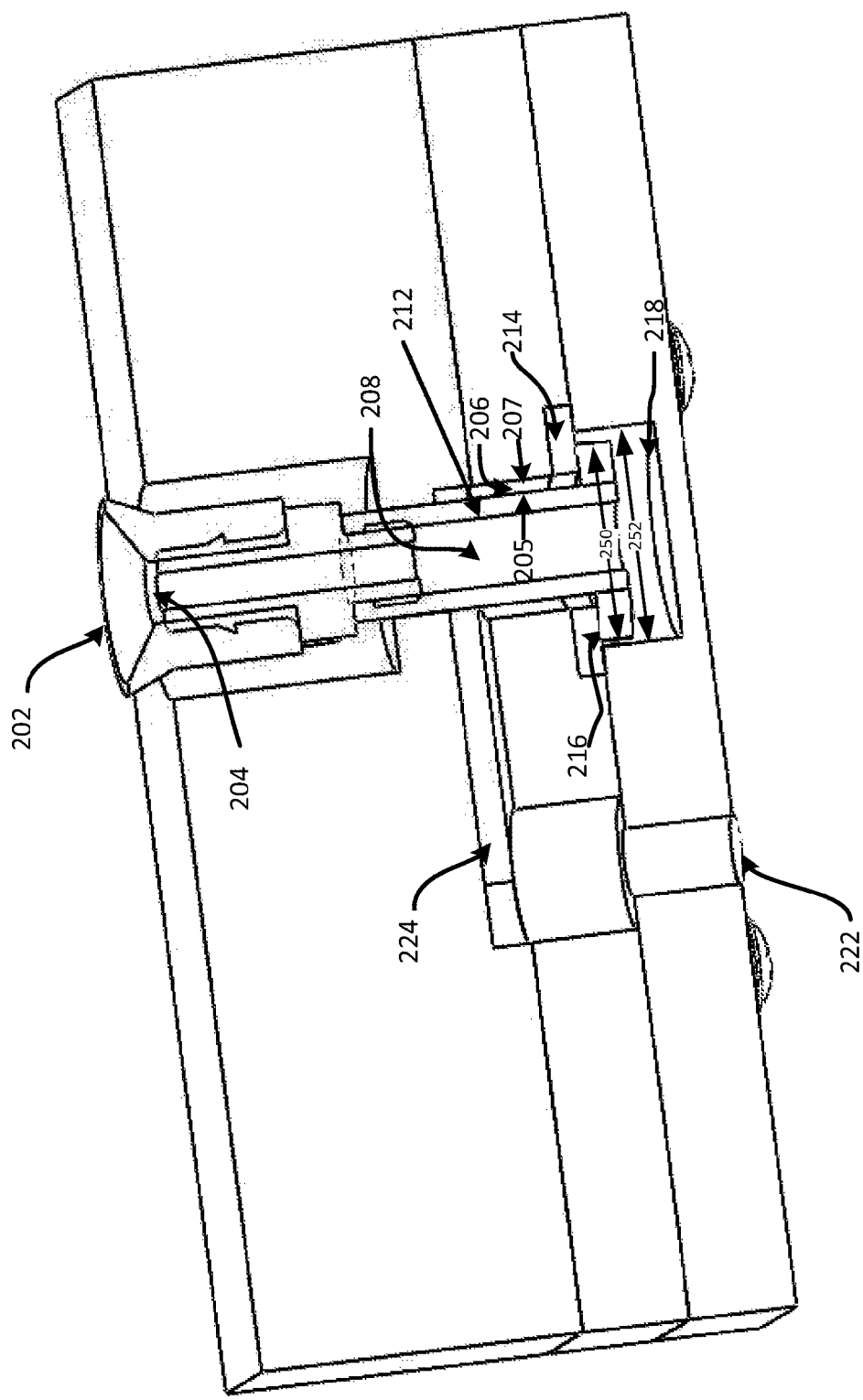
FIGS. 2A-2B are schematic views of a vacuum device.
Figure 2B:
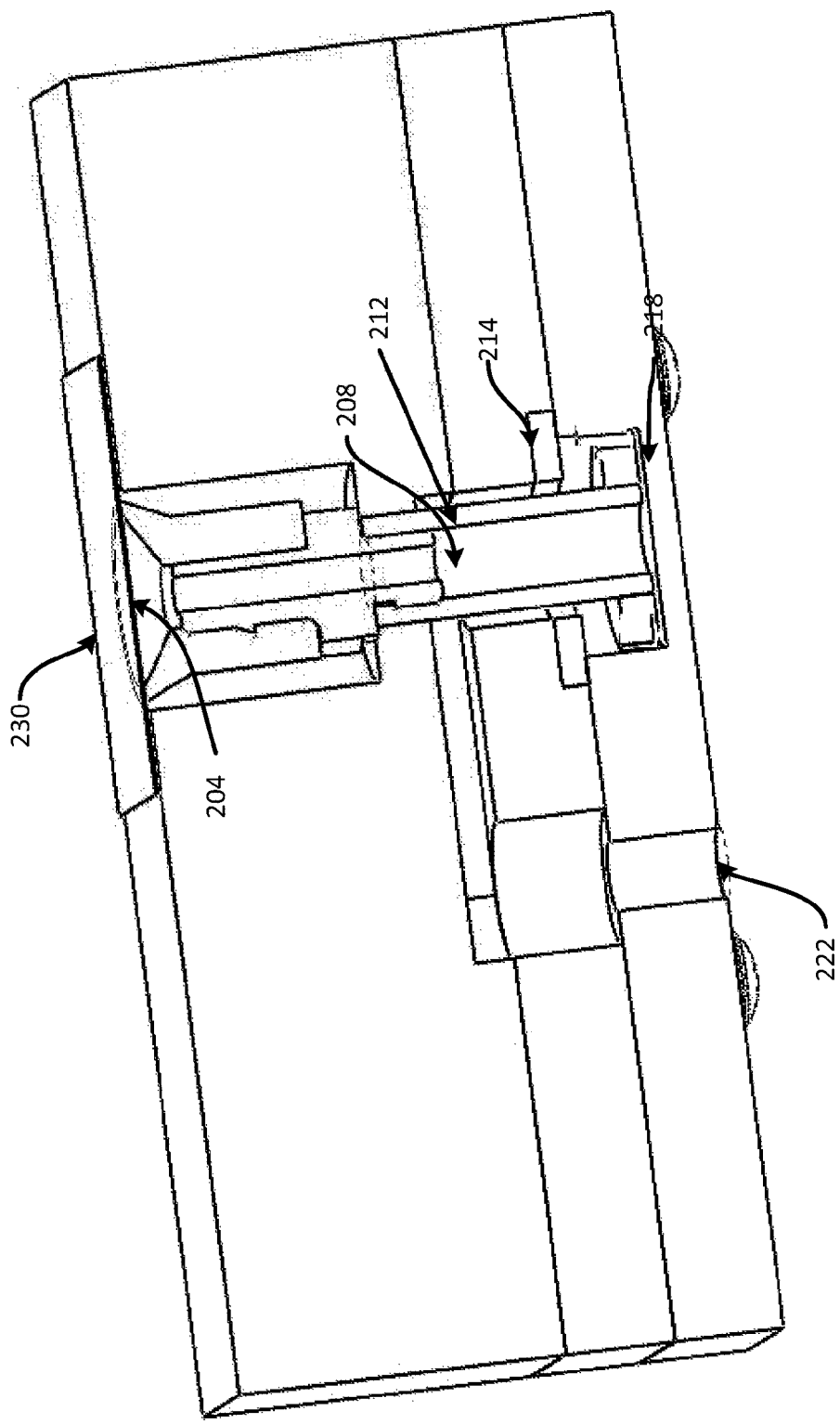

While in the examples described above in relation to FIGS. 1A-C the bottom portion of the plunger 212 included in orifice 220, in some examples, a differential in sizing between the bottom portion 216 of the plunger 212 and the diameter of the cavity 218 can be utilized to provide/prohibit the airflow. For example, as shown in FIGS. 2A and 2B, rather than having an orifice 220 in the plunger 212, the bottom portion 216 of the plunger 212 has a diameter (as indicated by arrow 250) that is smaller than a diameter of the cavity 218 (as indicated by arrow 252). Due to the difference in the diameter of the plunger to the diameter of the cavity, airflow is permitted around the plunger 212 when the vacuum cup 202 is depressed (FIG. 2B). Similar to the situation described above, the total cross-sectional area of the spacing between the plunger 212 and the cavity is less than the cross-sectional area of the opening 204 in the vacuum cup 202. Thus, when media is removed from the vacuum cup 202, a pressure differential develops across the plunger 212 and the flow supplied through vacuum port 222 is restricted through the spacing between the plunger and the cavity wall. This pressure differential causes the plunger to rise and contact the seal 214 thereby restricting vacuum flow to the vacuum cup 202 (FIG. 2A).

Figure 3:
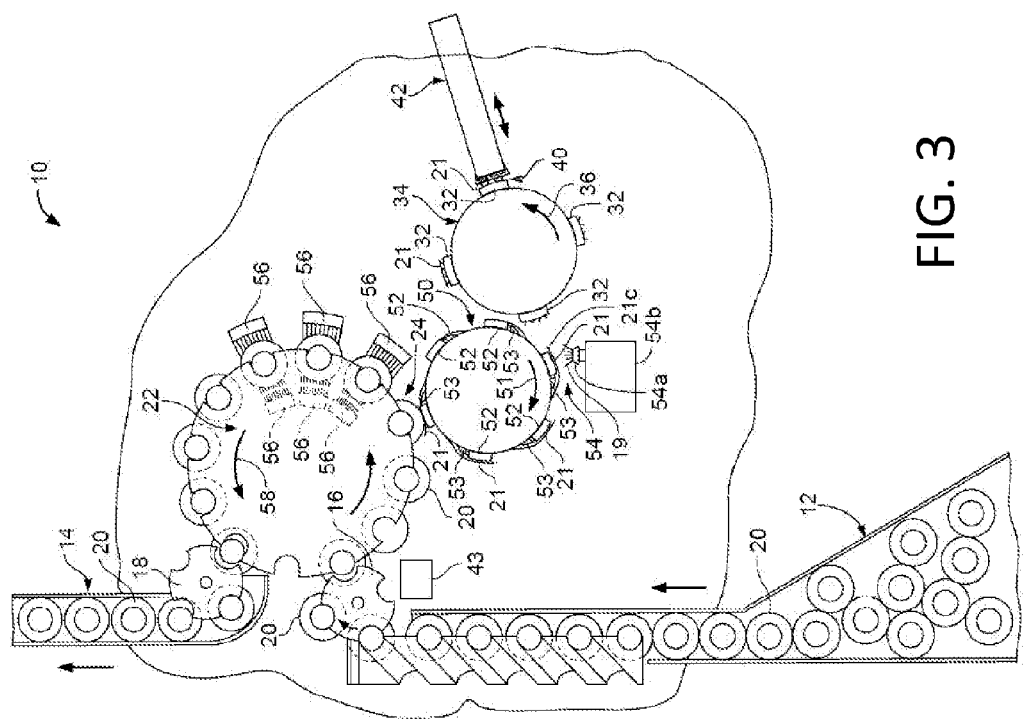
FIG. 3 is a schematic view illustrating a labeling apparatus.
Figure 4A:
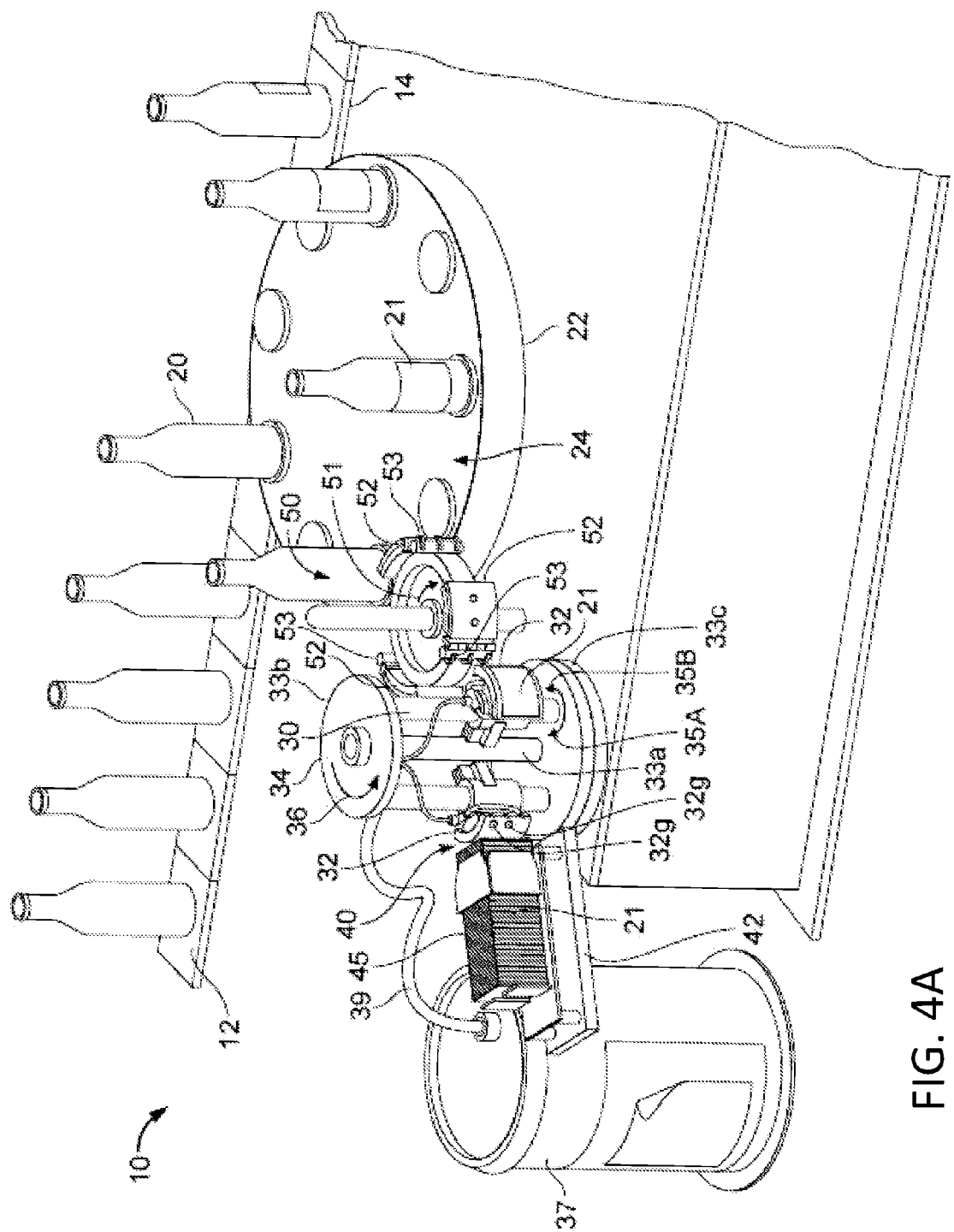
FIG. 4A is the perspective view of the apparatus of FIG. 3.
Figure 4B:
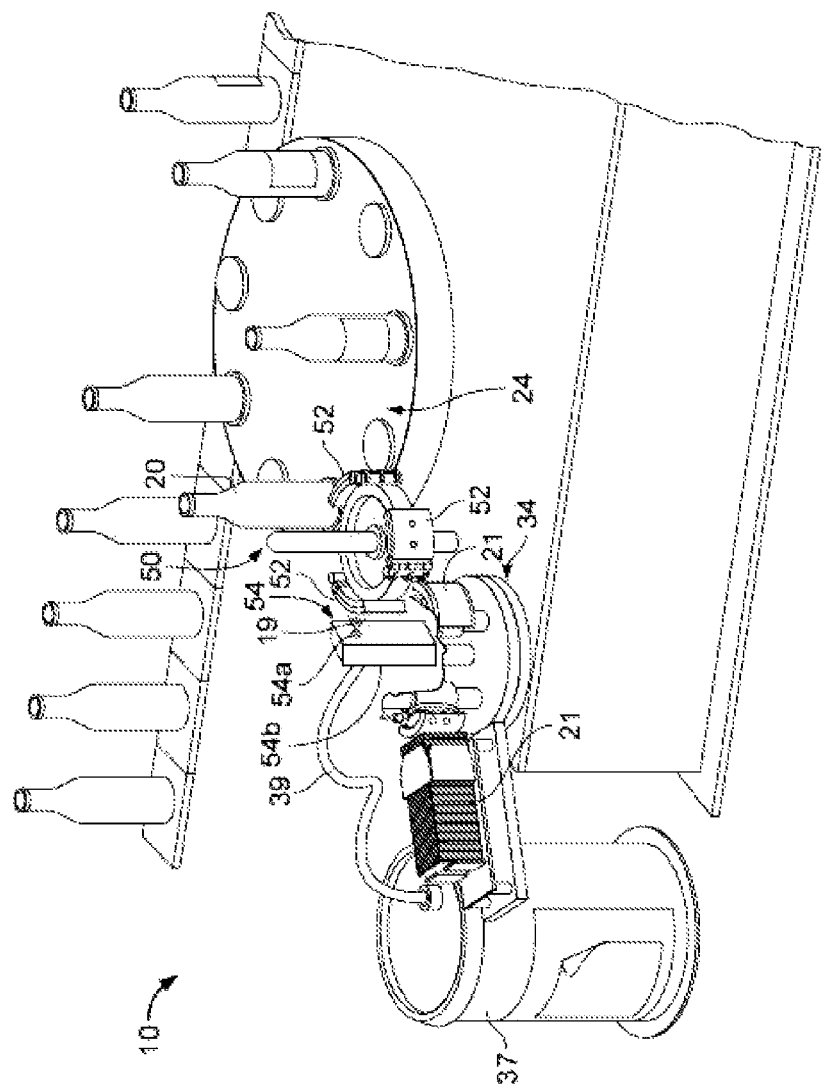
FIG. 4B is same perspective view as FIG. 4A with the first rotating transfer member partial broken to show the adhesive activation station along the second rotating transfer station.

Referring to FIGS. 3, 4A and 4B, an apparatus 10 for automatically applying labels to containers is shown Apparatus 10 employs an inlet conveyor section 12, an outlet conveyor section 14 and rotating bottle-transfer members 16 and 18 for transferring bottles 20 from the inlet conveyor section to a rotating platform or turret 22, and for removing bottles 20 from the rotating turret 22 to the exit conveyor section 14, respectively, after the bottles have been directed through label application station 24. However, in some embodiments an in-line system that does not require the use of a rotating turret to handle the bottles, or other containers, during the label application operation can be used. Bottle-transfer members 16 and 18 are not shown in FIGS. 4A and 4B for purposes of illustration.

The system 10 also includes two transfer members 34 and 51 that are used to transfer a label from a magazine 42 that retains a stack 45 of labels to the bottles 20. More particularly, during use, the first rotating transfer member 34 uses a suction based pallet to remove a non-activated label from the magazine 42 and transfer the label to a pallet on the second rotating member 51. Once the label is secured on the second rotating member, the label is removed from the pallet on the first rotating member and vacuum flow through the openings in the first pallet ceases based on the automatic vacuum modulation mechanism described above in relation to FIGS. 1A-C and 2A-B. Subsequently, a fluid is applied by an adhesive activation station 54 and the activated label is subsequently applied to the bottle.

More particularly, multiple pallets 32 are mounted on the first rotating transfer member 34 (rotated in the direction of arrow 36) through support shafts 33a mounted for oscillatory motion relative to the support shaft, as represented by the arrow heads 35 and 35A. Transfer member 34 rotates along a shaft 33 a pair mounting plates 33a and 33 between which support shafts 33a extend between. This oscillatory motion is provided by a cam drive arrangement. Exemplary cam drive arrangements for rotating a transfer member are known to those skilled in the art.

In the one embodiment, pallets 32 are oscillated in the counterclockwise direction of arrow 35A, as viewed in FIG. 4A. Pallets 32 are directed sequentially by the rotating member 34 to a transfer station 40. The transfer station 40 includes a magazine 42 retaining a stack 45 of cut labels 21 therein. A label is transferred from the transfer station 40 by application of a vacuum to the pallet 32. More particularly, contact between suction cups on the pallet and the label cause the plunger to be depressed and vaccuum to be applied to a vacuum cup on the pallet 32 to retain the label on the pallet 32. The label continues to be retained on the pallet 32 during rotation of the transfer member 34 by continued application of the vacuum.

Figure 5:
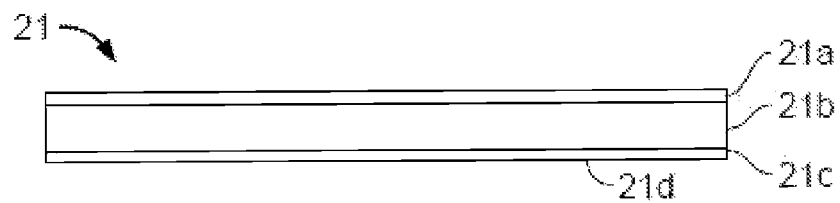
FIG. 5 is cross-sectional view of one of the labels of FIG. 3.

As shown in FIG. 5, each label (or media) 21 has a printable layer 21a formed on the front side of a stock, media, or facesheet 21b, and a back side 21c with a solvent (fluid) sensitive adhesive agent layer 21d (such as a polymer type adhesive) which possesses no tack in its dry or non-activated state. Layer 21d enables label 21 to become tacky along its back side once layer 21d becomes tacky upon application of activating fluid 19 when supplied at adhesive activation station 54, as described later below. This enables the label once its adhesive is activated to adhere along its back surface to a variety of article surfaces, such as paper, cardboard, metal, as well as glass and plastics. In the example of FIG. 3, the containers 20 in the case of bottles may be glass or plastic. Exemplary liner-free labels 21 and activating fluid 19 are described in U.S. Pat. No. 8,334,336 titled "Fluid Activatable Adhesives and Fluids for Activating Same for Use with Liner-Free Labels" and U.S. Pat. No. 8,334,335 titled "Fluid Activatable Adhesives and Fluids for Activating Same for Use with Liner-Free Labels", the contents of each of which are hereby incorporated by reference in their entirety. The printable layer 21a may be a preprinted layer of ink(s) providing the desired label for container 20 as typical of labels applied to containers. Typically all labels in the stack 45 are identical for a given set of container 20 being processed by the apparatus 10.

Referring to FIGS. 6A-6D, a single pallet 32 is shown removed from its support shaft 33a. Each pallet 32 has a grooved front curved surface 32a with openings (e.g., channels, holes, etc.) 32b extending to a back surface 32c, as illustrated by dashed lines in FIG. 6B. The pallet 32 is mounted to its associated support shaft 33 by a clamp 32d. Received in each of holes 32b is a suction cup 32g having an opening 32h in communication with its associated hole 32b. There are four holes 32b which are bored through pallet 32 in right and left pairs with respect to FIG. 6A, where only the right pair of holes 32b is visible in FIG. 6B. The suction cup 32g is formed of Vinyl, Polyurethane, Nitrile, Silicone, or other soft rubber. An upper surface of the suction cup 32g is co-planar with the curved surface 32a of the pallet 32. The size, number, and location of the suction cups 32g can vary based on the size and weight of the labels to be applied by the labeling system 10. In one particular embodiment, the suction cups 32g have a diameter of between 2 mm and 20 mm. The depth of the suction cup 32g can be between 0.5 mm and 5 mm. Thus, in general, the suction cup has a semi-spherical shape with a curved upper surface. The suction cup 32g has a solid upper surface that interrupts the grooves in the front curved surface 32a such that the grooves do not extend across the suction cup 32g. In some examples, the suction cups 32 are raised above the surface of the grooves. In some embodiments in which the suction cups 32 are raised above the surface of the pallet the label is adhered to the face of the suction cups and suspended above the surface of the pallet such that the label does not physically contact with the grooved surface.

A suction supply mechanism is provided along each pallet 32. In the preferred embodiment, along the backside of each pallet 32 are two vacuum generators 32f (see FIG. 6D). Each of the vacuum generators 32f has a port 32i for output of suction/vacuum, via a flexible tube 32k, to one of two manifold member 32e, and an port 32l for input of air pressure delivered via tubing 32m which splits to provide air pressure to port 32l of each vacuum generator 32f.

Figure 6A:
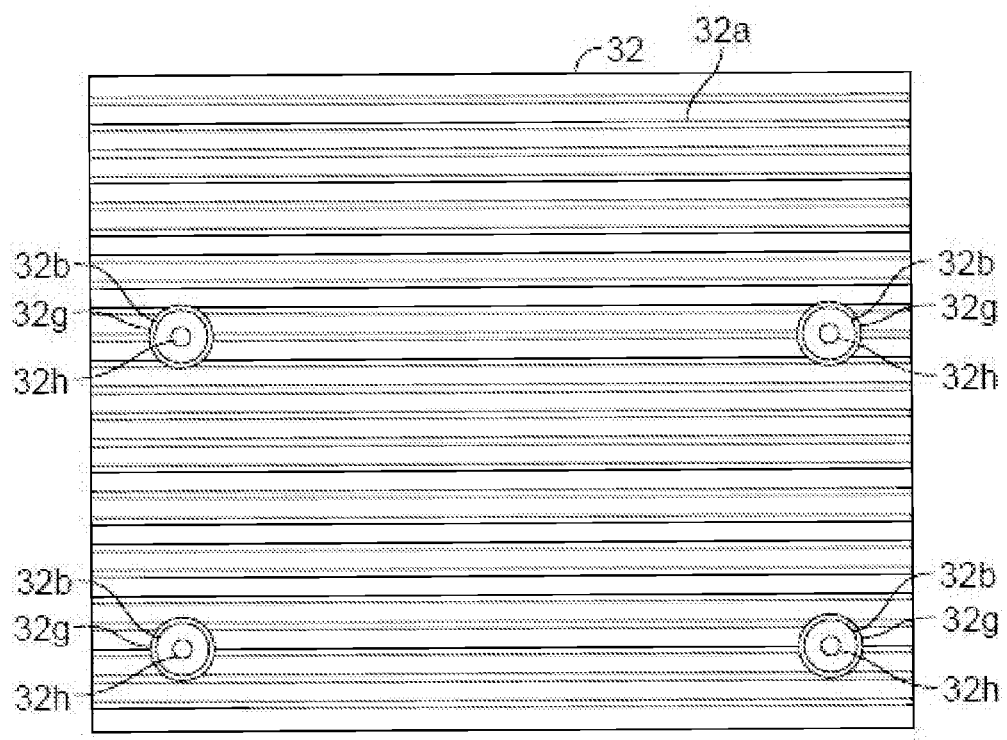
FIG. 6A is front view of one of the transfer pallets of FIG. 3.
Figure 6C:
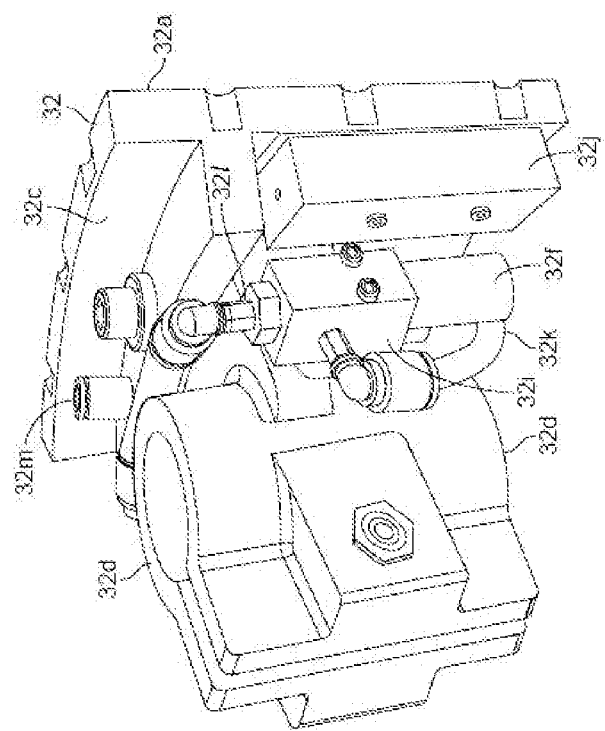
FIG. 6C is a perspective view of one of the pallets mounted to the first rotating transfer member of FIG. 3 taken from the right end along the back thereof showing the suction supply mechanism for retaining a label when received upon the pallet.
Figure 6B:
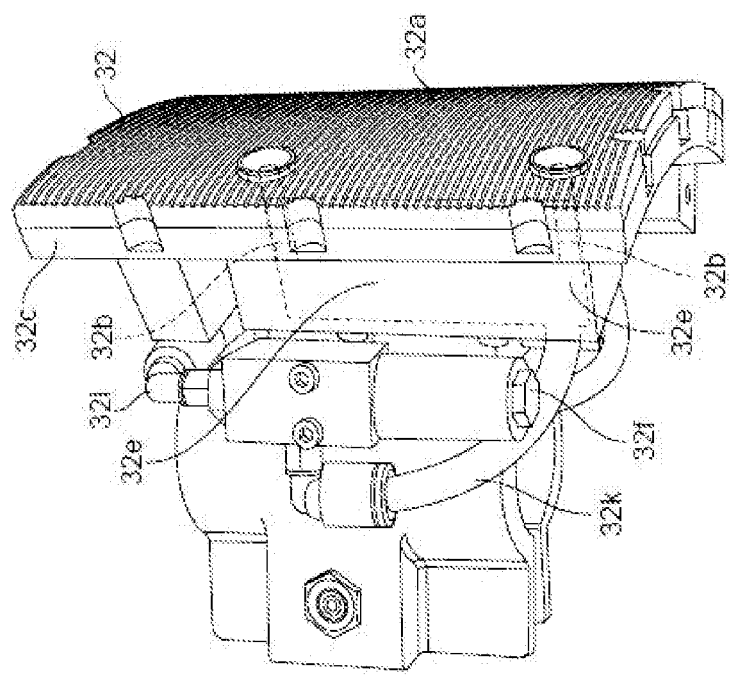
FIG. 6B is a perspective view of one of the pallets mounted to the first rotating transfer member of FIG. 3 taken from the right end showing the suction supply mechanism for retaining a label when received upon the pallet.
Figure 6D:
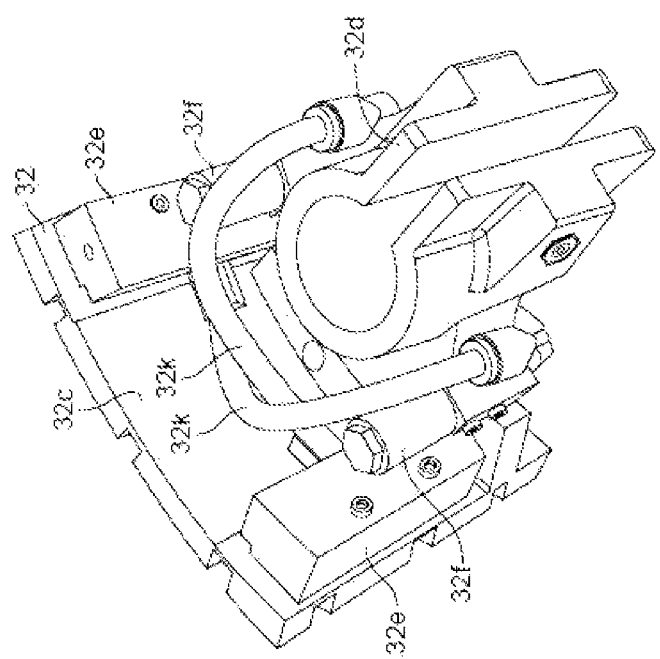
FIG. 6D is a perspective view of one of the pallets mounted to the first rotating transfer member of FIG. 3 taken top end along the back thereof showing the suction supply mechanism for retaining a label when received upon the pallet.

Each of the two manifold members 32e are mounted to back surface along the right and left sides thereof as best shown in FIG. 6D and are aligned with right and left pairs of holes 32, respectively. The manifold members 32e each has a chamber 32j, as shown in dashed lines in FIG. 6B, in communication with such different one of pairs of holes 32b. Thus, suction may be provided via holes 32b to openings 32h of suction cups 32g from generators 32f, via tubes 32d and manifolds 32e, where each generator 32f supplies suction to a different pair of holes 32b. Thus, the vacuum applied to the suction cups 32g on each of the pallets 32 is controlled by a device such as the one shown in FIGS. 1A-C and 2A-B above. Although four holes 32b and suction cups 32g, additional holes with suction cups may be provided through which suction may be communicated as described above.

In one particular example, vacuum generators 32f can be a venturi type vacuum generator. However, other mechanisms for supplying suction which are sufficient to retain a label upon pallet 32 may be used.

This magazine 42 is mounted for linear reciprocating motion toward and away from the exposed surface of the transfer pallets 32, respectively, as is conventional in Krones labeling machines. The linear reciprocating movement of the magazine 42 is controlled by a photo detection system 43 positioned to detect the presence of a container at a specified location, preferably at the downstream end of helical feed roll 12, of the inlet conveyor 12. If a container is detected at the specified location on the inlet conveyor 12, the magazine 42 will be moved into, or maintained in a forward position for permitting a desired transfer pallet 32 to engage and remove the lowermost label from the stack of cut labels 21 retained in the magazine. The desired pallet 32 is the one that receives a label that ultimately will be aligned with the detected container 20 when that container is in label applicator section 24 of the rotating turret 22, to thereby transfer, or apply, the label to the container, as will be described in detail hereinafter. If a container 20 is not detected at the specified location by the photo detection system 43, then the magazine 42 will be retracted to preclude a predetermined transfer pad 32 from engaging and receiving the lowermost label in the magazine 21, which label ultimately would have been directed to an empty container position at the label applicator section 24 on the turret 22 resulting from a container not being in the specified location being monitored by the photo detection system.

Still referring to FIGS. 3, 4A, and 4B, when a transfer pallet 32 is in a position aligned for engaging the lowermost label 21 carried in the magazine 42, that pallet 32 is oscillated in the clockwise direction of arrow 35, as viewed in FIG. 3, for engaging the lowermost label 21 in the magazine 42, and then to remove that label 21 from the stack by suction from the pallet via holes 32b and their associated suction cups 32g, so that the front surface 21a of label 21 faces front surface 32a of pallet 32 and is retained upon pallet 32. Suction cups 32g assist is directing suction to portions, areas, or locations along the front surface 21a which contact the suction cups. Other areas or label 42 not engaged by suction extend along the curved front surface 32a of pallet 32.

As shown in FIG. 3, pallets 32 with the labels 21 thereon, are then rotated by the support member 34 to a second rotating transfer member 50 (rotated in the direction of arrow 51) having a plurality of rotated pads 52 each having a cam operated label retaining (or gripping) members or fingers 53 disposed about the periphery thereof for engaging labels 21 carried by the transfer pallets 32 and transferring the labels to the second rotating transfer member 50. Each of the retaining members 53 grip to receive upon its associated pads 52 the labels 21 carried on the pallets 32, and the later at label application station 24 such retaining members 50 are positioned to release labels. During transfer of the labels to the second rotating transfer member 50, the pallets 32 are oscillated in the counterclockwise direction of arrow 35A, as viewed in FIG. 4A.

Referring again to FIGS. 3, 4A and 4B, the second rotary transfer member 50, with labels 21 thereon, is directed through an adhesive activation station 54 to change the a solvent sensitive adhesive agent layer 21d to a tacky state to permit the label to be securely and effectively adhered to the outer surface of a container 20 along its back surface 21c; preferably a curved outer surface of a bottle, where presented thereto at label application station 24.

As shown in FIG. 3 and FIG. 4B, adhesive activation station 54 has one or more fluid dispensing mechanisms (e.g., such as a sprayer 54a) for application of pressurized adhesive activation fluid 19 onto labels 21. The activation fluid can be a combination of one or more solvents, such as water and/or low boiling point alcohols. In some examples, the activation fluid does not contain any suspended or dissolved solids in the liquid (e.g., the fluid is a blend of one or more neat drying solvents and/or water) and only contains solvents. In some examples, the solvents can have low enough vapor pressures to evaporate in room temperature environmental conditions. By including no suspended solids in the activation fluid and utilizing volatile solvents, any liquid that is released and not applied to the labels (overspray) will dry clean thereby reducing cleanup and maintenance of the system 10. Each of the one or more sprayers 54a may be a nozzle with a valve that is held in a fixture 54b (depicted schematically as a block in FIGS. 3 and 4B). Each nozzle receives fluid 19, via a tube 39, from a source of such fluid, as depicted by container 37 in FIGS. 4A and 4B. The nozzle's valve is actuated when needed to apply fluid 19 to wet label 21 as it moves through station 54. Timing of spraying of fluid 19 for different run speeds of apparatus 10 is enabled by a control system. For example, the nozzle of each of the one or more sprayers 54a may be an air-assisted nozzle. However, any sprayer mechanism may be used may be used so that adequate fluid 19 is sprayed on layer 21 as moves with respect to the stationary station 54. For example, the fluid dispensing mechanisms can include an array of one or multiple fan or cone nozzles controlled by valves, an array of one or multiple air-assisted fan or cone nozzles controlled by valves, and/or an inkjet-type spray head.

Each of the sprayers 54a provides a fan pattern aligned with the height of the label 21 as it is rotated along upon pad 52 and held thereto by retaining members 53. Thus, the activation fluid is provided directly from the sprayers 54a onto the label. Preferably multiple sprayers 54a, such as two, for spraying fluid are provided to obtain the desire surface coverage of the label with fluid 19 as it moves through station 54. In one particular example, when two nozzles are used, each nozzle produces at or approximately 2 inch fan when incident the label, and together they activate a label which is 4 inches in height to deliver a uniform layer of fluid 19. Sprayers 54 are aligned in a vertical dimension parallel to the height of label 21, where the sprayers are at a distance from the label 21 to direct coverage of the entire back (or at least substantially the entire back such as greater than 90% of the back surface) of the label 21 needed to assure label adhesive at station 24. The flow rate out of the nozzle is variable depending on label speed to produce a desired fluid 19 deposition rate, such as 0.15 g per 24 square inches. In another example, a single sprayer 54*a* provides a spray pattern sufficient with height of the label.

In this manner, the second rotating transfer member 50 directs the labels held upon pads 52 through an adhesive activation station 54 to apply a fluid 19 for activating adhesive along each label's back surface 21*c* to change its layer 21*d* from a non-tacky state to a tacky state just before application of the label to a container at label application station 24. For example, the fluid activatable adhesive is only tacky to permit the label to be adhered to the outer surface of a container at a location closely adjacent the label application station 24.

Still referring to FIG. 3, each of the labels 21 is directed from the station 54 with the adhesive thereon being in a tacky condition to uniformly and effectively adhere the labels 21 to a container, and the label is then immediately rotated into a position for engaging the outer periphery of a bottle 20 carried on the turret 22 in the label application station 24. It should be noted that the spacing of the labels on the second rotating transfer member 50 and the speed of rotation of the transfer assembly are timed with the speed of rotation of the rotating turret 22 such that each label carried on the second rotating transfer member 50 is sequentially directed into engagement with an adjacent bottle carried on the rotating turret. Moreover, the photo detection system 43 prevents a label from being carried to the label application station 24 when a bottle for receiving such label is missing from that station.

Each of the labels 21 is applied essentially at its midline to the periphery of an adjacent bottle 20, thereby providing outer wings extending in opposed directions from the center line of the label, which is adhered to the bottle. Pad 52 is actuated by a cam mechanism forward at the label activation station 24 with respect to container 20 to receive the label from pad 52. As the pad 52 is often made of deformable material, such as rubber foam, the pad 52 deforms responsive by the contact of the container with the pad to assist in joining the container outer surface to label by its activated adhesive. This manner of applying a label to a bottle is conventional and is employed in rotary labeling equipment, for example manufactured by Krones. However, the labels can be applied to the outer surface of the bottles in other ways. When the amount of tack on the label 21 after label activation station 54 is less than traditionally used cold glue or hot melt adhesive, the amount of deformation should be increased to assist in joining the container outer surface to label by its activated adhesive as well as increasing the level of wrap around of the label to container 20. The amount of deformation can be adjusted by increasing the forward position of pad 32 with respect to container 20 at label activation station 24, After a label 21 initially is adhered to a bottle 20 in the label application station 24, the rotating turret 22 directs each bottle, with the label attached thereto, through a series of opposed inner and outer brushes 56. As the bottles are directed through the series of brushes the bottles are also oscillated back and forth about their central axis to thereby create an interaction between the bottles, labels and brushes to effectively adhere the entire label to the periphery of each bottle.

The labels 21 after have been effectively adhered to the bottles 20, the bottles are carried by the rotating turret 22 in the direction of arrow 58 to the bottle-transfer member 18, at which point the bottles are transferred to the outlet conveyor section 14 for subsequent packaging.

The label retaining members 53 release and forward movement of pad 54 are timed with position the pad 54 of second transfer member 50 at label application station 24.

While in at least some of the examples above, each of the pallets 32 included a suction supply mechanism provided along each pallet 32 (e.g., vacuum generators 32*f* along the backside of each pallet 32 shown in FIG. 6D). However, in some embodiments, the vacuum generator can be located remotely from the pallet. For example, the vacuum generator can be located at a distance from the rotating platform or turret 22.

Figure 7:
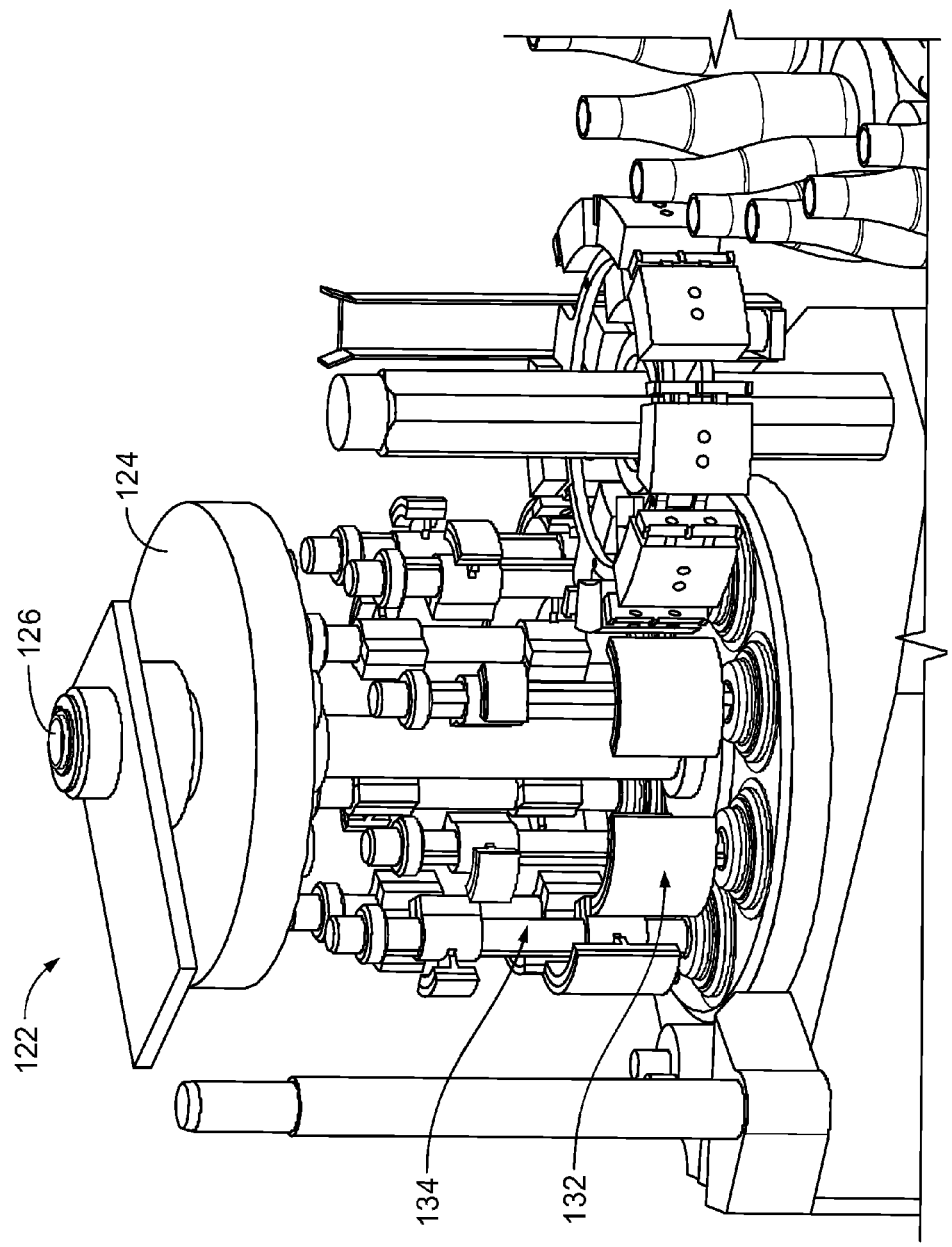
FIG. 7 is a schematic, plan view illustrating a labeling apparatus.

One exemplary system in which the vacuum generator is located remotely from the turret is shown in FIG. 7. In a rotating platform or turret 122 a large diameter rotary union 126 on the top of the turret 122 transfers vacuum between a flexible hose coming from a remote vacuum pump (not pictured) through the center axis of the turret 122. A hollow chamber 124 is connected to the vacuum pump such that, during use, the hollow chamber 124 is evacuated by the vacuum pump such that the hollow chamber exhibits a pressure below atmospheric pressure (e.g., at a vacuum of 10 in. of mercury to 30 in. of mercury). Each turret 122 would have a connection to the vacuum chamber. In one particular example, flexible conduits extend from the bottom of the chamber 124 to each pallet 132 (not shown). In another example, additional rotary unions would be used to transmit vacuum through the centers of each pallet shaft 134, and then a secondary conduit would be used to transport vacuum to the individual suction cups in the pallet 132.

Figure 8:
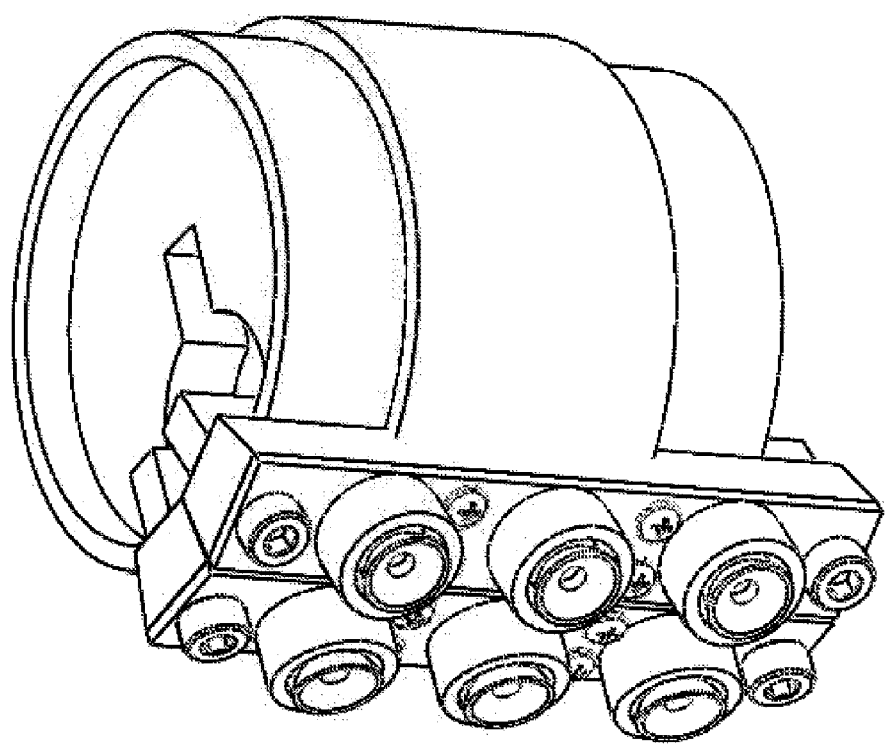
FIG. 8 is a diagram of a pallet.

While in at least some of the examples shown above the pallets (e.g., pallets 32 and 132) have a flat or substantially flat surface and in some situations the label can be in physical contact with at least a portion of the surface. In other examples, such as the example shown in FIG. 8, an upper surface of a pallet can be formed primarily of an arrangement of multiple suction cups. In such examples, the label is held by the suction cups and does not contact a surface of the pallet itself (other than the upper surfaces of the suction cups).

As noted above, the pallet can have multiple suction cups arranged in a configuration in which the vacuum can be selectively applied to a subset of the suction cups when the label is smaller than the total size of the pallet and can be selectively applied based on the presence/absence of the label. In order to selectively apply the vacuum to various ones of the suction cups and at various times, each suction cup has an associated vacuum modulation device configured to automatically modulate the vacuum applied to the vacuum cup based on the presence/absence of the item to be transported at the vacuum cup. Thus, each suction cup can be individually controlled. A single pressurized air conduit comes in to the pallet from above. In a machine where vacuum was being transmitted instead of pressurized air, vacuum would be transported straight into the pallet.

In some examples, the systems described herein can be configured to accommodate labels of different sizes. Systems such as those described herein can provide various advantages over glue-apply techniques (e.g., systems in which a tacky glue is applied to the back of a label). Such glue apply-techniques are believed to require different parts (e.g., different pallets and pads) for different dimensions of labels.

From the foregoing description, it will be apparent that there has been provided an improvement to an automated labeling machine for use with labels having fluid activatable adhesive. Variations and modifications in the herein described improvement, method, or system with machine 10 and liner-free labels 21, will undoubtedly suggest themselves to those skilled in the art. Accordingly, the foregoing description should be taken as illustrative and not in a limiting sense.

What is claimed is:

1. A vacuum-based transport device comprising:
a pallet comprising:
an opening configured to provide vacuum for receiving and releasably securing an item to the pallet;
a vacuum cup mounted in the opening having a central hole connected to the opening; and
a vacuum modulation device configured to automatically modulate the vacuum applied to the vacuum cup based on the presence/absence of the item at the vacuum cup, the vacuum modulation device including a plunger moveable between an open position in which vacuum is applied to the vacuum cup and a closed position in which vacuum is not applied to the vacuum cup.

2. The device of claim 1, wherein the plunger is configured to automatically move between the open position and the closed position based on a pressure differential formed upon removal of the item from the vacuum cup.

3. The device of claim 1, wherein the vacuum modulation device comprises:
a sealing device; and
wherein the plunger is disposed in a cavity and in the closed position the plunger is in contact with the sealing device and airflow is restricted to the vacuum cup and in the open position the plunger is separated from the sealing device and airflow is permitted to the vacuum cup.

4. The device of claim 3, wherein:
the opening has a first cross-sectional area;
the plunger includes an opening having a second cross-sectional area that is smaller than the first cross-sectional area.

5. The device of claim 4, wherein the first and second cross-sectional areas are configured to establish a pressure differential across the plunger to cause the plunger to move between the open position and the closed position upon removal of the item from the vacuum cup.

6. The device of claim 1, further comprising a vacuum supply means mechanism for communicating vacuum to the opening.

7. The device of claim 1, wherein the pallet includes a plurality of openings each having associated vacuum cups and vacuum modulation devices.

8. An apparatus for applying to containers labels having a back surface with fluid activatable adhesive, the apparatus comprising:
a guidance mechanism configured to provide a path for receiving a plurality of labels having a back surface with a fluid activatable adhesive that is non-tacky until activated, the guidance mechanism including at least one rotating transfer member having a plurality of pallets, each of the pallets having:
a plurality of openings through which vacuum is selectively communicated;
vacuum cups mounted for receiving and releasably securing a label to the pallet, each vacuum cup having a central hole connected to an associated opening; and
vacuum modulation devices configured to automatically modulate the vacuum applied to an associated vacuum cup based on the presence or absence of the label at the associated vacuum cup the vacuum modulation devices each including a plunger moveable between an open position in which vacuum is applied to the vacuum cup and a closed position in which vacuum is not applied to the vacuum cup;
an adhesive activation station along the path configured to apply to the back surface of the labels a fluid to activate the adhesive along the back surface of the label; and
a label application station at the end of the path configured to apply the labels with the activated adhesive onto an exterior surface of a corresponding object.

9. The apparatus of claim 8, further comprising a vacuum supply mechanism coupled to each of said pallets for communicating vacuum to said openings.

10. The apparatus of claim 8, wherein the plunger is configured to automatically move between the open position and the closed position based on a pressure differential formed upon removal of the label from the vacuum cup.

11. The apparatus of claim 8, wherein the vacuum modulation devices each include:
a sealing device; and
wherein the plunger is disposed in a cavity and in the closed position the plunger is in contact with the sealing device and airflow is restricted to the vacuum cup and in the open position the plunger is separated from the sealing device and airflow is permitted to the vacuum cup.

12. The apparatus of claim 11, wherein:
the opening has a first cross-sectional area;
the plunger includes an opening having a second cross-sectional area that is smaller than the first cross-sectional area and the first and second cross-sectional areas are configured to establish a pressure differential across the plunger to cause the plunger to move between the open position and the closed position upon removal of the label from the associated vacuum cup.

13. A vacuum-based transport device comprising:
a pallet comprising:
an opening configured to provide vacuum for receiving and releasably securing an item to the pallet;
a vacuum cup having a central hole connected to the opening; and
a vacuum modulation device configured to automatically modulate the vacuum applied to the vacuum cup based on the presence/absence of the item to be transported at the vacuum cup, the vacuum modulation device including a plunger moveable between an open position and a closed position;
wherein the vacuum cup is moveable and the vacuum modulation device is configured to modulate the vacuum and provide vacuum to the vacuum cup upon physical depression of the vacuum cup.

14. The device of claim 13, wherein the plunger is configured to automatically move between the open position and the closed position based on a pressure differential formed upon removal of the item from the vacuum cup.

15. The device of claim 13, wherein the vacuum modulation device comprises:
a sealing device; and
wherein the plunger is disposed in a cavity and in the closed position the plunger is in contact with the sealing device and airflow is restricted to the vacuum cup and in the open position the plunger is separated from the sealing device and airflow is permitted to the vacuum cup.

16. The device of claim 15, wherein:
the opening has a first cross-sectional area;
the plunger includes an opening having a second cross-sectional area that is smaller than the first cross-sectional area, the first and second cross-sectional areas being configured to establish a pressure differential across the plunger to cause the plunger to move between the open position and the closed position upon removal of an item from the vacuum cup.

* * * * *